(12) United States Patent
Futamura

(10) Patent No.: US 6,726,595 B2
(45) Date of Patent: Apr. 27, 2004

(54) OIL PRESSURE CONTROL APPARATUS FOR AN AUTOMATIC TRANSMISSION

(75) Inventor: Suguru Futamura, Toyokawa (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/102,935

(22) Filed: Mar. 22, 2002

(65) Prior Publication Data

US 2002/0137594 A1 Sep. 26, 2002

(30) Foreign Application Priority Data

Mar. 22, 2001 (JP) ....................................... 2001-083100

(51) Int. Cl.⁷ .............................................. B60K 41/24
(52) U.S. Cl. .......................... 477/75; 475/127; 475/128
(58) Field of Search ................................ 475/127, 128; 477/75, 156, 158, 163

(56) References Cited

U.S. PATENT DOCUMENTS

| | | | | |
|---|---|---|---|---|
| 5,288,279 A | * | 2/1994 | Sakai et al. | 475/127 |
| 5,342,253 A | * | 8/1994 | Mizobe et al. | 475/128 |
| 5,347,885 A | * | 9/1994 | Taga et al. | 477/65 |
| 5,643,125 A | * | 7/1997 | Long et al. | 475/127 |
| 5,779,585 A | * | 7/1998 | Tsukamoto et al. | 475/128 |
| 5,860,886 A | * | 1/1999 | Kim | 475/128 |
| 6,077,182 A | * | 6/2000 | Long et al. | 475/128 |
| 6,171,211 B1 | * | 1/2001 | Ortmann et al. | 477/62 |
| 6,258,010 B1 | * | 7/2001 | Bai et al. | 477/143 |
| 6,270,444 B1 | * | 8/2001 | Tsutsui et al. | 477/143 |
| 6,299,560 B1 | * | 10/2001 | Fujioka et al. | 475/119 |
| 6,319,165 B1 | * | 11/2001 | Itou et al. | 475/119 |
| 6,471,613 B1 | * | 10/2002 | Botosan et al. | 475/120 |
| 6,488,610 B2 | * | 12/2002 | Micklash et al. | 477/131 |
| 2001/0009880 A1 | * | 7/2001 | Suzuki et al. | 475/122 |

FOREIGN PATENT DOCUMENTS

JP   2001-280468 A   10/2001

* cited by examiner

Primary Examiner—Rodney H. Bonck
Assistant Examiner—David D. Le
(74) Attorney, Agent, or Firm—Burns, Doane, Swecker & Mathis, LLP

(57) ABSTRACT

An oil pressure control apparatus for an automatic transmission helps ensure sufficient oil pressure to be supplied to a friction engagement element for performing at least either a first shift stage or a reverse shift stage. Further, the oil pressure control apparatus for the automatic transmission effectively performs pressure adjustment of the oil pressure to be supplied to the friction engagement element upon shifting a neutral shift stage to either the first shift stage or the reverse shift stage.

6 Claims, 15 Drawing Sheets

Fig.3

|  |  | C1 | C2 | C3 | B1 | B2 |
|---|---|---|---|---|---|---|
| R range | R |  |  | ○ |  | ○ |
| N range | N |  |  |  |  | ○ |
| D range | N |  |  |  | (○) | ○ |
|  | 1st | ○ |  |  |  | ○ |
|  | 2nd | ○ |  |  | ○ |  |
|  | 3rd | ○ |  | ○ |  |  |
|  | 4th | ○ | ○ |  |  |  |
|  | 5th |  | ○ | ○ |  |  |
|  | 6th |  | ○ |  | ○ |  |

Fig.13

| Shift pattern | ON-OFF S/V 35 | ON-OFF S/V 36 | ON-OFF S/V 37 | D range C1 | D range C2 | D range C3 | D range B1 | D range B2 | N range C1 | N range C2 | N range C3 | N range B1 | N range B2 | R range C1 | R range C2 | R range C3 | R range B1 | R range B2 |
|---|---|---|---|---|---|---|---|---|---|---|---|---|---|---|---|---|---|---|
| -1 | o | x | o | PL | | | | 2 | | | | | | | | PL | | 2 |
| 0  | o | o | o | 1  | | | | 2 | | | | | | | | 3  | | 2 |
| 1  | x | o | o | 3  | | | 1 | 2 | | | | | | | | | | 2 |
| 2  | x | x | o | PL | | | 1 | 2 | | | | | | | | PL | | 2 |
| 3  | x | x | x | PL | | 2 | 1 | | | | 2 | | 2 | | | 2 | | PL |
| 4  | o | x | x | PL | 1 | 2 | | | | | 2 | | 2 | | | 2 | | PL |
| 5  | o | o | x | 1  | | 2 | | | | | 2 | | 2 | | | 2 | | PL |
| 6  | x | o | x |    | PL | 2 | 1 | | | | 2 | | 2 | | | 2 | | PL |

REMARKS:
- o : electrically excited
- x : electrically de-excited
- 1 : The friction engagement elements controlled by the first linear SOL valve 22 for supplying the control pressure from the first control valve 25
- 2 : The friction engagement elements controlled by the second linear SOL valve 23 for supplying the control pressure from the second control valve 26
- 3 : The friction engagement elements controlled by the third linear SOL valve 24 for supplying the control pressure from the third control valve 27

Fig.14

N range

| Shift pattern | Shift stage | C1 | C2 | C3 | B1 | B2 |
|---|---|---|---|---|---|---|
| 1 | N |  |  |  |  | ● |

○: low pressure
●: high pressure
◎: line pressure

Fig.15

R range

| Shift pattern | Shift stage | C1 | C2 | C3 | B1 | B2 |
|---|---|---|---|---|---|---|
| 0 | R |  |  | ● |  | ● |

○: low pressure
●: high pressure
◎: line pressure

Fig.16

D range

| Shift pattern | Shift stage | C1 | C2 | C3 | B1 | B2 |
|---|---|---|---|---|---|---|
| 1 | N | ○ |  |  | ●(○) | ● |
| 1 | 1st | ● |  |  | ○ | ● |
| 1 | 2nd | ● |  |  | ● | ○ |

○: low pressure
●: high pressure
◎: line pressure

Fig.17

| Shift pattern | Shift stage | C1 | C2 | C3 | B1 | B2 |
|---|---|---|---|---|---|---|
| 2 | 1st | ◎ |  |  | ○ | ● |
| 2 | 2nd | ◎ |  |  | ● | ○ |

○: low pressure
●: high pressure
◎: line pressure

Fig.18

| Shift pattern | Shift stage | C1 | C2 | C3 | B1 | B2 |
|---|---|---|---|---|---|---|
| 3 | 2nd | ◎ |  | ○ | ● |  |
|   | 3rd | ◎ |  | ● | ○ |  |

○: low pressure
●: high pressure
◎: line pressure

Fig.19

| Shift pattern | Shift stage | C1 | C2 | C3 | B1 | B2 |
|---|---|---|---|---|---|---|
| 4 | 3rd | ◎ | ○ | ● |  |  |
|   | 4th | ◎ | ● | ○ |  |  |

○: low pressure
●: high pressure
◎: line pressure

Fig.20

| Shift pattern | Shift stage | C1 | C2 | C3 | B1 | B2 |
|---|---|---|---|---|---|---|
| 5 | 4th | ● | ◎ | ○ |  |  |
|   | 5th | ○ | ◎ | ● |  |  |

○: low pressure
●: high pressure
◎: line pressure

Fig.21

| Shift pattern | Shift stage | C1 | C2 | C3 | B1 | B2 |
|---|---|---|---|---|---|---|
| 6 | 5th |  | ◎ | ● | ○ |  |
|   | 6th |  | ◎ | ○ | ● |  |

○: low pressure
●: high pressure
◎: line pressure

OIL PRESSURE CONTROL APPARATUS FOR AN AUTOMATIC TRANSMISSION

This application is based on and claims priority under 35 U.S.C. §119 with respect to a Japanese Patent Application 2001-083100 filed on Mar. 22, 2001, the entire content of which is incorporated herein by reference.

FIELD OF THE INVENTION

This invention generally relates to an oil pressure control apparatus for an automatic transmission. More particularly, this invention pertains to an oil pressure control apparatus for an automatic transmission for changing a shift stage by selectively supplying control pressure outputted from plural control valves to a required friction engagement element.

BACKGROUND OF THE INVENTION

A known oil pressure control apparatus for an automatic transmission switches a shift stage from a neutral shift stage to a first shift stage by selectively supplying control pressure outputted from plural control valves to a required friction engagement element. Assuming the neutral shift stage is performed by a first combination of the friction engagement elements to be engaged, the control pressure supplied from each control valve to each friction engagement element is set to be approximately at a maximum oil pressure level to maintain the friction engagement elements for the first combination under an engaged condition.

Assuming the first shift stage is performed by a second combination of the friction elements to be engaged upon a shifting operation of the shift stage from the neutral shift stage to the first shift stage, a hydraulic circuit of the oil pressure control apparatus is switched for supplying the control pressure from each control valve to each friction engagement element for the second combination while the friction engagement elements for the first combination have been maintained under the engaged condition by continuously supplying the control pressure from the control valves thereto. The control pressure supplied to the friction engagement elements for the second combination is then gradually increased and the control pressure supplied to the other friction engagement elements is gradually decreased. Therefore, the friction engagement elements for the second combination are gradually shifted to the engaged condition and the other friction engagement elements are gradually shifted to a disengaged condition to smoothly shift the shift stage from the neutral shift stage to the first shift stage.

The control pressure supplied to the friction engagement elements for the second combination is then set to be approximately at a maximum oil pressure level to maintain the friction engagement elements for the second combination under the engaged condition. On the other hand, the control pressure supplied to the other friction engagement elements is set to be approximately at a minimum oil pressure level to release the friction engagement elements from the engaged condition. Under the above described condition, the first shift stage is continuously performed.

However, the above described oil pressure control apparatus may suffer from the following drawbacks. The engaging and disengaging operations of the required friction engagement elements are performed only by increasing or decreasing the control pressure to be supplied to the elements from the control valves. In this case, the engaging force for engaging the friction engagement elements is required to have a certain amount of engaging force when the first shift stage with a large torque is continuously performed. Therefore, a maximum pressure level of the control pressure is required to be sufficiently large for engaging the friction engagement elements.

However, when the shift stage is shifted to the first shift stage as described above, the control pressure supplied to the required friction engagement elements is required to be gradually increased. In this case, the adjusting range of the control pressure will be increased when the maximum oil pressure level of the control pressure is set to be sufficiently large based upon the engaging force of the friction engagement elements to be engaged for continuously performing the first shift stage. Therefore, the pressure adjustment ability may be deteriorated and the shifting operation may not be accurately performed. On the other hand, in case the maximum pressure level of the control pressure is restrained by heightening the resolving ability of the pressure adjustment, the friction engagement elements to be engaged for the first shift stage may slip when the torque is increased in response to a depressing operation of the accelerator pedal. Therefore, the friction engagement elements may not be maintained under the engagement condition.

Accordingly, the above-mentioned automatic transmission oil pressure control apparatus is still susceptible of certain improvements with respect to ensuring sufficient oil pressure to be supplied to the friction engagement elements for performing at least any one of the first shift stage or a reverse shift stage. Further, the apparatus is susceptible of certain improvements with respect to preferably performing the pressure adjustment of the oil pressure supplied to the friction engagement elements upon the shifting operation of the shift stage from the neutral shift stage to at least any one of the first shift stage and the reverse shift stage.

SUMMARY OF THE INVENTION

An oil pressure control apparatus for an automatic transmission including an output shaft is provided with plural linear solenoid valves, plural control valves, plural friction engagement elements, plural shift valves, and plural ON-OFF solenoid valves. The plural linear solenoid valves output modulated pressure in response to electric current applied to the linear solenoid valves. The plural control valves output control pressure in response to the modulated pressure from the linear solenoid valves. The plural friction engagement elements are engaged or disengaged in response to the supply of either the control pressure from the control valves or the line pressure for performing plural shift stages through engagement and disengagement of combinations of the plural friction engagement elements. The plural shift valves change the friction engagement element supplied with the control pressure or the line pressure in response to oil pressure applied to the shift valves. The plural ON-OFF solenoid valves change the supply condition of oil pressure to the shift valves in response to electric current applied to the ON-OFF solenoid valves.

The oil pressure control apparatus for the automatic transmission is further provided with a control unit for controlling the control pressure from the control valves by controlling the electric current applied to the linear solenoid valves and for changing the friction engagement element to be supplied with the control pressure or the line pressure via the shift valve by controlling the electric current applied to the ON-OFF solenoid valves. The control unit consequently sets a first shift pattern for supplying the control pressure to the friction engagement element for a first shift stage or a reverse shift stage from the control valve by a first combination of the current applied condition of the plural ON-OFF solenoid valves upon performing the first shift stage or the reverse shift stage and a second pattern for supplying the line pressure to the friction engagement element for the first shift stage or the reverse shift stage by a second combination of the current applied condition of the plural ON-OFF solenoid valves upon performing the first shift stage or the reverse shift stage.

Therefore, when the shift stage is shifted from the neutral shift stage to either the first shift stage or the reverse shift stage, pressure adjustment can be performed accurately by setting the first shift pattern, and the oil pressure to be supplied to the friction engagement element can be sufficiently ensured by setting the second shift pattern.

According to another aspect of the present invention, the control unit can determine the control pressure to be supplied to the common friction engagement element to be engaged at the first shift stage and at the reverse shift upon a neutral range so as to shift to the first shift stage and the reverse shift stage.

When the shift stage is shifted to either the first shift stage or the reverse shift stage by changing the shift range to a driving range or a reverse range, the oil pressure is required to be supplied only to a remaining friction engagement element which was not engaged upon the neutral range for engaging the remaining friction engagement element. Therefore, the response of the friction engagement elements can be improved by reducing the number of friction engagement elements to be engaged at one time, i.e., by reducing the number of friction engagement elements to be supplied with the oil pressure at one time.

According to another aspect of the present invention, the control unit determines the control pressure to be supplied to the required friction engagement element upon a neutral shift stage of a driving range for engaging the required friction engagement element so as not to rotate the output shaft of the automatic transmission.

Generally, the engaging operations of the required friction engagement elements are respectively interrupted so as not to transmit rotation of an engine to the automatic transmission upon the neutral shift stage of the driving range. The automatic transmission is hence required to be engaged with the engine when the vehicle is started. For example, the vehicle is moved in a vehicle rearward direction until the automatic transmission is connected to the engine again upon a hill start of the vehicle. On the other hand, upon the neutral shift stage of the driving range, the output shaft of the automatic transmission is designed so as not to be rotated as described above. Therefore, the shift stage can be shifted to the first shift stage without moving the vehicle in the vehicle rearward direction. That is, a smooth hill start of the vehicle can be performed.

According to another aspect, the supply of the oil pressure to any one of the friction engagement elements to be engaged for a vehicle forward movement can be performed via a manual valve only upon the driving range and the supply of the oil pressure to the required friction engagement elements to be engaged for a vehicle rearward movement can be performed via the manual valve only upon the reverse range.

The undesirable oil pressure supply to any one of the friction engagement elements to be engaged for the vehicle rearward movement can be prevented upon the driving range. The undesirable oil pressure supply to any one of the friction engagement elements to be engaged for the vehicle forward movement can be prevented upon the reverse range. Therefore, unintended driving upon each shift range due to mechanical failure including various valves, for example the reverse movement upon the driving range, the forward movement upon the reverse range, and the reverse and forward movements upon the neutral range, can be prevented.

According to another aspect, the plural friction engagement elements include a first friction clutch, a second friction clutch, a third friction clutch, a first friction brake, and a second friction brake. The control unit consequently sets a first shift pattern and a second shift pattern for performing a first shift stage. Upon the first shift pattern, the control pressure is supplied from the control valve to the first friction clutch to be engaged for performing the first shift stage. Upon a second shift pattern, the line pressure is supplied to the first friction clutch.

The control unit consequently sets the first shift pattern and the second shift pattern for performing a reverse shift stage. Upon the first shift pattern, the control pressure is supplied from the control valve to the third friction clutch to be engaged for performing the reverse shift stage. Upon the second shift pattern, the line pressure is supplied to the third friction clutch. Therefore, when the shift stage is shifted from the neutral shift stage to either the first shift stage or the reverse shift stage, pressure adjustment can be performed accurately by setting the first shift pattern and the oil pressure to be supplied to the friction engagement elements can be sufficiently assured by setting the second shift pattern.

Further, the control unit determines the control pressure to be supplied to the second friction brake to be engaged at the first shift stage and at the reverse shift stage for engaging the second friction brake upon the neutral range of the driving range so as to perform the first shift stage and the reverse shift stage.

When the shift stage is shifted to either the first shift stage or the reverse shift stage by changing the shift range to a driving range or a reverse range, the oil pressure is required to be supplied only to a remaining friction engagement element which was not engaged upon the neutral range for engaging the remaining friction engagement element. Therefore, the response of the friction engagement element can be improved by reducing the number of friction engagement elements to be engaged at one time, i.e., by reducing the number of the friction engagement elements to be supplied with the oil pressure at one time.

Further, the control unit determines upon the neutral shift stage at the driving range of the shift range the control pressure to be supplied to the first and second friction brakes for engaging the first and second friction brakes so as not to rotate the output shaft of the automatic transmission.

The automatic transmission is hence required to be engaged with the engine when the vehicle is started. For example, the vehicle is moved in a vehicle rearward direction until the automatic transmission is connected to the engine again upon a hill start of the vehicle. On the other hand, upon the neutral shift stage of the driving range, the output shaft of the automatic transmission is designed so as not to be rotated as described above. Therefore, the shift stage can be shifted to the first shift stage without moving the vehicle in the vehicle rearward direction. That is, a smooth hill start of the vehicle can be performed.

Further, the supply of the oil pressure to the first friction clutch or the second friction clutch to be engaged for a vehicle forward movement can be performed via the manual valve only upon the driving range and the supply of the oil pressure to the third friction clutch and the second friction brake to be engaged substantially at one time for a vehicle rearward movement can be performed substantially at one time via the manual valve only upon the reverse range.

The undesirable oil pressure supply to any one of the friction engagement elements to be engaged for the vehicle rearward movement can be prevented upon the driving range. The undesirable oil pressure supply to any one of the friction engagement elements to be engaged for the vehicle forward movement can be prevented upon the reverse range.

Therefore, unintended driving upon each shift range due to mechanical failure including various valves, for example the reverse movement upon the driving range, the forward movement upon the reverse range, and the reverse and forward movements upon the neutral range, can be prevented.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

FIG. 3 is a table showing the engagement and release conditions of each of the friction engagement elements for producing various shift stages.

FIG. 13 is a chart showing the different shift patterns in relation to the condition of the ON-OFF solenoid valves, the linear solenoid valves that control the engagement of the various friction engagement elements and the possible gear stages that can be produced.

FIG. 14 is a chart showing the transmission condition in shift pattern "1".

FIG. 15 is a chart showing the transmission condition in shift pattern "0".

FIG. 16 is a chart showing the transmission condition in shift pattern "1".

FIG. 17 is a chart showing the transmission condition in shift pattern "2".

FIG. 18 is a chart showing the transmission condition in shift pattern "3".

FIG. 19 is a chart showing the transmission condition in shift pattern "4".

FIG. 20 is a chart showing the transmission condition in shift pattern "5".

FIG. 21 is a chart showing the transmission condition in shift pattern "6".

DETAILED DESCRIPTION OF THE INVENTION

Figure 1:
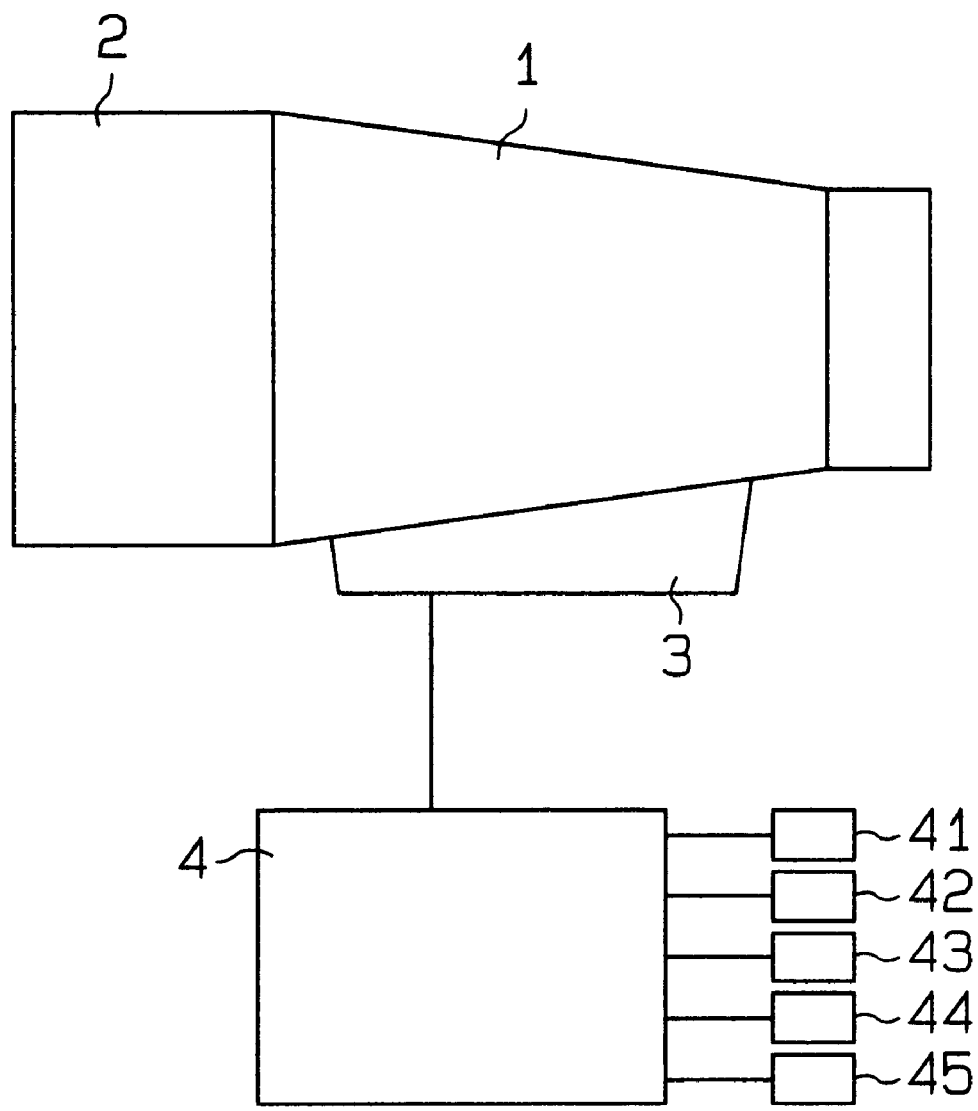
FIG. 1 is a schematic illustration of an entire control system for an automatic transmission according to an embodiment of the present invention.

Referring to FIG. 1, an automatic transmission control system for a vehicle according to an embodiment of the present invention is provided with an automatic transmission 1 connected to an output shaft of an engine 2, an oil pressure control unit 3, and an electronic control unit 4 (control unit). The oil pressure control unit 3 controls oil pressure to be supplied to hydraulically driven friction engagement elements (described later) included in the automatic transmission 1. The electronic control unit 4 controls the operations of the solenoid valves (described later) included in the oil pressure control unit 3.

Figure 2:
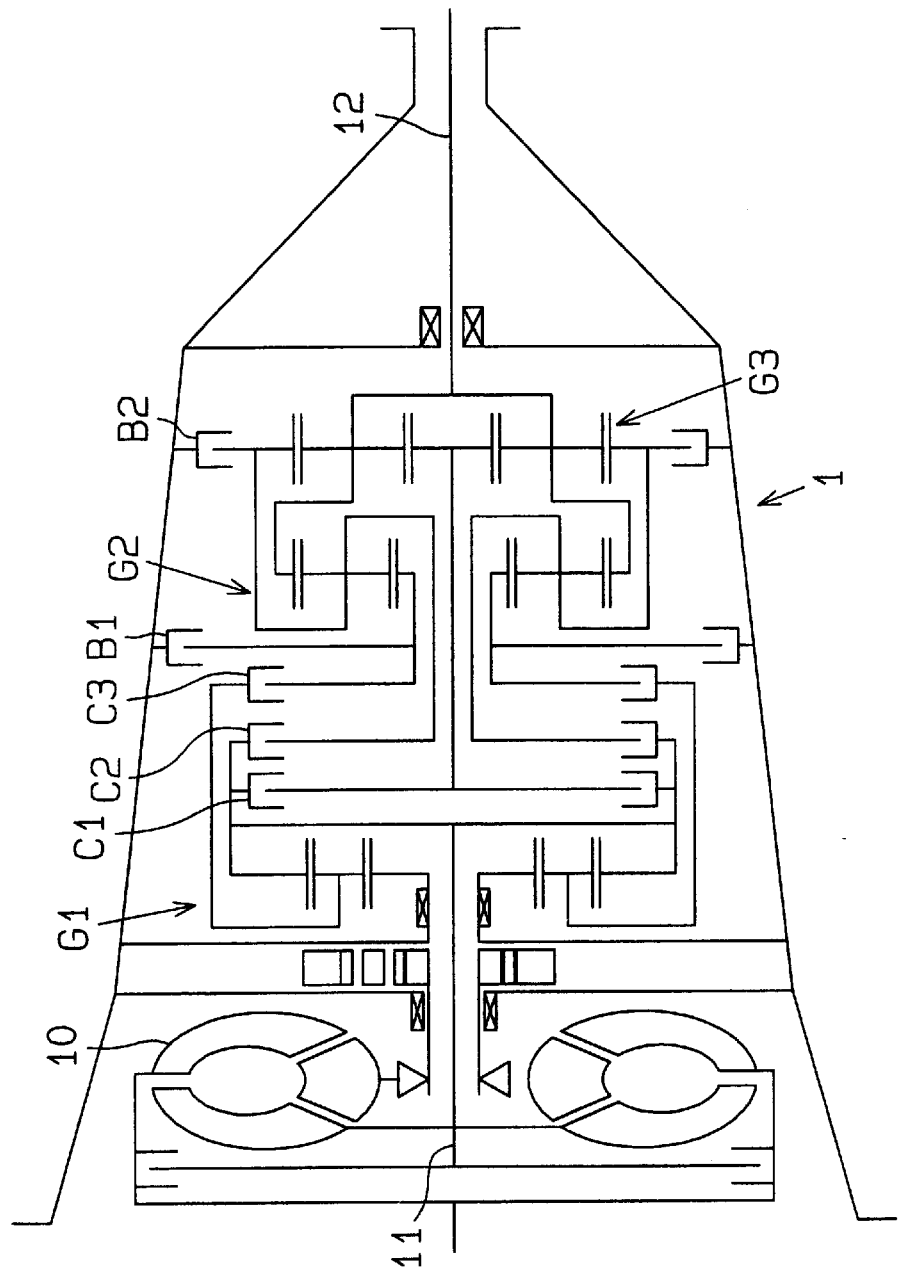
FIG. 2 is a skeleton or schematic view of the automatic transmission according to the embodiment of the present invention.

Referring to FIG. 2, the automatic transmission 1 includes an input shaft 11 serving as an output shaft of a torque converter 10, an output shaft 12 operatively connected to an axle shaft of the vehicle via a differential unit, and a gear train including a first planetary gear G1 with a single pinion gear, a second planetary gear G2 with a single pinion gear, and a third planetary gear G3 with a single pinion gear. The first planetary gear G1 includes a ring gear connected to the input shaft 11. The automatic transmission 1 is further provided with a plurality (five) friction engagement elements including a first friction clutch C1, a second friction clutch C2, a third friction clutch C3, a first friction brake B1, and a second friction brake B2. The oil pressure control unit 3 and the electronic control unit 4 switch or control the supply of oil pressure to the respective friction engagement elements so that each friction engagement element is selectively switched between an engaged condition and a disengaged condition. The shift stages and shift patterns of the automatic transmission 1 thus are selectively switched. Each of the friction engagement elements is switched to the engaged condition when the oil pressure at a high pressure level is supplied thereto by the oil pressure control unit 3 and is switched to the disengaged condition when the oil pressure at a low pressure level is supplied thereto by the oil pressure control unit 3.

Referring to FIG. 3, the automatic transmission 1 performs a single reverse shift stage, a neutral shift stage and six forward shift stages including a plurality of underdrive shift stages (the first shift stage, second shift stage, third shift stage and fourth shift stage) and several overdrive shift stages (the fifth shift stage and the sixth shift stage). The symbol o in FIG. 3 indicates that the respective friction engagement element is under the engaged condition to perform the respective shift stage of the automatic transmission 1. The absence of the symbol o in FIG. 3 indicates that the respective friction engagement element is under the disengaged condition.

For example, the vehicle is driven in a rearward direction by reversing the rotation of the output shaft 12 relative to the input shaft 11 which occurs when only the third friction clutch C3 and the second friction brake B2 are under the engaged condition. The reverse shift stage is hence performed in the automatic transmission 1. The neutral shift stage is performed when only the second friction brake B2 is under the engaged condition. The first shift stage is performed when only the first friction clutch C1 and the second friction brake B2 are under the engaged condition. The second shift stage is performed when only the first friction clutch C1 and the first friction brake B1 are under the engaged condition. The third shift stage is performed when only the first and third friction clutches C1, C3 are under the engaged condition. The fourth shift stage is performed when only the first and second friction clutches C1, C2 are under the engaged condition. The fifth shift stage is performed when only the second and third friction clutches C2, C3 are under the engaged condition. The sixth shift stage is performed when only the second friction clutch C2 and the first friction brake B1 are under the engaged condition.

The relationship between the shift range (reverse range, neutral range, driving range) selected by manual operation of a selector lever and the shift stage is not described above. However, when the neutral shift stage under the driving range is performed, the first friction brake B1 is further engaged in addition to the second friction brake B2 so as to perform the neutral shift stage in the automatic transmission 1. Each planetary gear G1, G2, G3 in the automatic transmission 1 is then fixed so as to not rotate the output shaft 12. This mechanism is known as a hill hold mechanism.

The structure and controlling condition of the oil pressure control unit 3 for engaging and disengaging each friction engagement element are described below with reference to the hydraulic circuit diagrams illustrated in FIGS. 4–12, the chart shown in FIG. 13 for showing various shift patterns set in response to the controlling condition of the hydraulic control unit 3, and the charts illustrated in FIGS. 14–21 for showing the shift stage corresponding to oil supply upon a predetermined shift pattern.

Referring to FIGS. 4–12, the oil pressure control unit 3 is supplied with a line pressure PL generated in response to an oil pressure discharged from an oil pump. The oil pressure control unit 3 is provided with a manual valve 21, a first linear solenoid valve 22, a second linear solenoid valve 23, a third linear solenoid valve 24, a first control valve 25, a second control valve 26, a start control valve 27, an LU (lock-up) control valve 28, a first shift valve 31, a second shift valve 32, a third shift valve 33, a fourth shift valve 34, an ON-OFF solenoid valve 35, an ON-OFF solenoid valve 36, and an ON-OFF solenoid valve 37. The manual valve 21 is employed for selecting a hydraulic circuit operatively associated with the shift range selected by the operation of the shift lever. The first, second and third linear solenoid valves 22, 23, 24 respectively apply the line pressure PL for outputting modulated pressure mod in response to electric current applied to each linear solenoid valve 22, 23, 24.

The first control valve 25 introduces or receives the modulated pressure mod outputted from the first linear solenoid valve 22 and applies the line pressure PL for generating a control pressure corresponding to the modulated pressure mod. The second control valve 26 introduces or receives the modulated pressure mod outputted from the second linear solenoid valve 23 and applies the line pressure PL for generating a control pressure corresponding to the modulated pressure mod. The start control valve 27 and the LU control valve 28 selectively introduce or receive the modulated pressure mod outputted from the third linear solenoid valve 24 and apply the line pressure PL for generating a control pressure corresponding to the modulated pressure mod introduced to the start control valve 27 and the LU control valve 28, respectively.

The start control valve 27 outputs the control pressure especially for starting a vehicle, for driving the vehicle in the rearward direction, or upon the first shift stage. On the other hand, the LU control valve 28 outputs the control pressure relative to a lock-up clutch LU of the torque converter 10, especially when the engine 2 is rotated at a higher speed. According to this illustrated and described embodiment, the LU control valve 28 is operated for performing the third, fourth, fifth, and sixth shift stages by the automatic transmission 1. As described above, the start control valve 27 and the LU control valve 28 are not operated at the same time. Therefore, the control pressure is selectively outputted from either the start control valve 27 or the LU control valve 28 by selectively introducing the modulated pressure mod from the linear solenoid valve 24 via the fourth shift valve 34.

Each of the first, second, third and fourth shift valves 31, 32, 33, 34 introduces or receives the line pressure PL or the control pressure outputted from each control valve 25, 26, 27, 28. Further, each shift valve 31, 32, 33, 34 switches the supply of the line pressure PL or the supply of the control pressure supplied to each friction engagement element C1, C2, C3, B1, B2 in response to an operating condition of each shift valve 31, 32, 33, 34 corresponding to the oil pressure supplied thereto.

The ON-OFF solenoid valves 35, 36 respectively switch the supply of the oil pressure supplied to the first and second shift valves 31, 32 in response to the electric current applied to the ON-OFF solenoid valves 35, 36, and further respectively switch the operating conditions of the first and second shift valves 31, 32. The ON-OFF solenoid valve 37 switches the supply of the oil pressure supplied to the third and fourth shift valves 33, 34 in response to the electric current applied to the ON-OFF solenoid valve 37 and further respectively switches the operating conditions of the third and fourth shift valves 33, 34.

When no current is supplied to the first and third linear solenoid valves 22, 24, the first and third linear solenoid valves 22, 24 generate no modulated pressure mod. On the other hand, in response to an increase of the electric current applied the first and third linear solenoid valves 22, 24, the first and third linear solenoid valves 22, 24 increase the modulated pressure mod. The modulated pressure mod is outputted to the first control valve 25 from the first linear solenoid valve 22 and is outputted to either the start control valve 27 or the LU control valve 28 from the third linear solenoid valve 24. When the electric current is not applied to the first and third linear solenoid valves 22, 24, the modulated pressure is not supplied to the control valve 25 from the first linear solenoid valve 22 and is not supplied to the control valves 27, 28 from the third linear solenoid valve 24.

The second linear solenoid valve 23 generates the modulated pressure mod to be a maximum pressure level when no electric current is applied to the second linear solenoid valve 23 and decreases the modulated pressure mod in response to an increase of the electric current applied thereto. The modulated pressure mod is outputted to the corresponding control valve 26 from the second linear solenoid valve 23. When the electric current at the maximum electric current level is applied to the second linear solenoid valve 23, the modulated pressure is not supplied to the control valve 26 from the second linear solenoid valve 23.

The first control valve 25 and either the control valve 27 or the control valve 28 generate no control pressure when no electric current is applied to the first and third linear solenoid valves 22, 24. On the other hand, the control pressures generated by the control valve 25 and either the control valve 27 or the control valve 28 are increased in response to the increase of the electric current applied to the first and third linear solenoid valves 22, 24. The control valve 26 generates the control pressure to be the maximum pressure level when no electric current is applied to the second linear solenoid valve 23. The control pressure generated by the control valve 26 is decreased in response to an increase of the electric current applied to the second linear solenoid valve 23. Therefore, the control valves 25, 26, 27, 28 generate substantially no control pressure when no electric current is applied to the first and third linear solenoid valves 22, 24 and the electric current at the maximum pressure level is applied at the maximum pressure level to the second linear solenoid valve 23.

The ON-OFF solenoid valves 35, 36 are normally closed type valves which respectively supply oil pressure to the first and second shift valves 31, 32 with the electric current being applied to the valves 35, 36 and supply no oil pressure thereto when no electric current is applied to the valves 35, 36. The ON-OFF solenoid valve 37 is a normally closed type valve which supplies oil pressure to the third and fourth shift valves 33, 34 when electric current is applied to the valve 37 and supplies no oil pressure to the valves 33, 34 when no electric current is applied thereto.

Each of the first and second shift valve 31, 32 is maintained under a first operating condition when the oil pressure is supplied thereto from the ON-OFF solenoid valves 35, 36 respectively. In this case, a valve element of each shift valve 31, 32 is biased downward in FIGS. 4–12. On the other hand, each of the first and second shift valves 31, 32 is maintained under a second operating condition when the supply of oil pressure from the respective valves 35, 36 is interrupted. In this case, the valve element of each shift valve 31, 32 is returned to the upper side in FIGS. 4–12.

Each of the third and fourth shift valves 33, 34 is respectively maintained under a first operating condition when the oil pressure is supplied thereto from the ON-OFF solenoid valve 37. In this case, a valve element of each shift valve 33, 34 is biased downward in FIGS. 4–12. On the other hand, each of the third and fourth shift valves 33, 34 is maintained under a second operating condition when the supply of oil pressure from the valve 37 is interrupted. In this case, the valve element of each shift valve 33, 34 is returned to the upper side in FIGS. 4–12.

Set forth below with reference to FIGS. 13–21 is a description of each shift pattern that is set in response to the controlling condition of the oil pressure control unit 3. As illustrated in FIG. 3, the automatic transmission 1 according to the disclosed and illustrated embodiment performs eight shift patterns, ranging from a shift pattern −1 to a shift pattern 6 for shifting the shift stage. More particularly, the eight shift patterns are performed by combinations of the ON-OFF solenoid valves 35, 36, 37 that are respectively electrically excited (energized) or electrically de-excited (de-energized). FIGS. 4–12 illustrate the controlling condition of the oil pressure control unit 3 in response to each shift pattern from the shift pattern −1 to the shift pattern 6.

Figure 6:
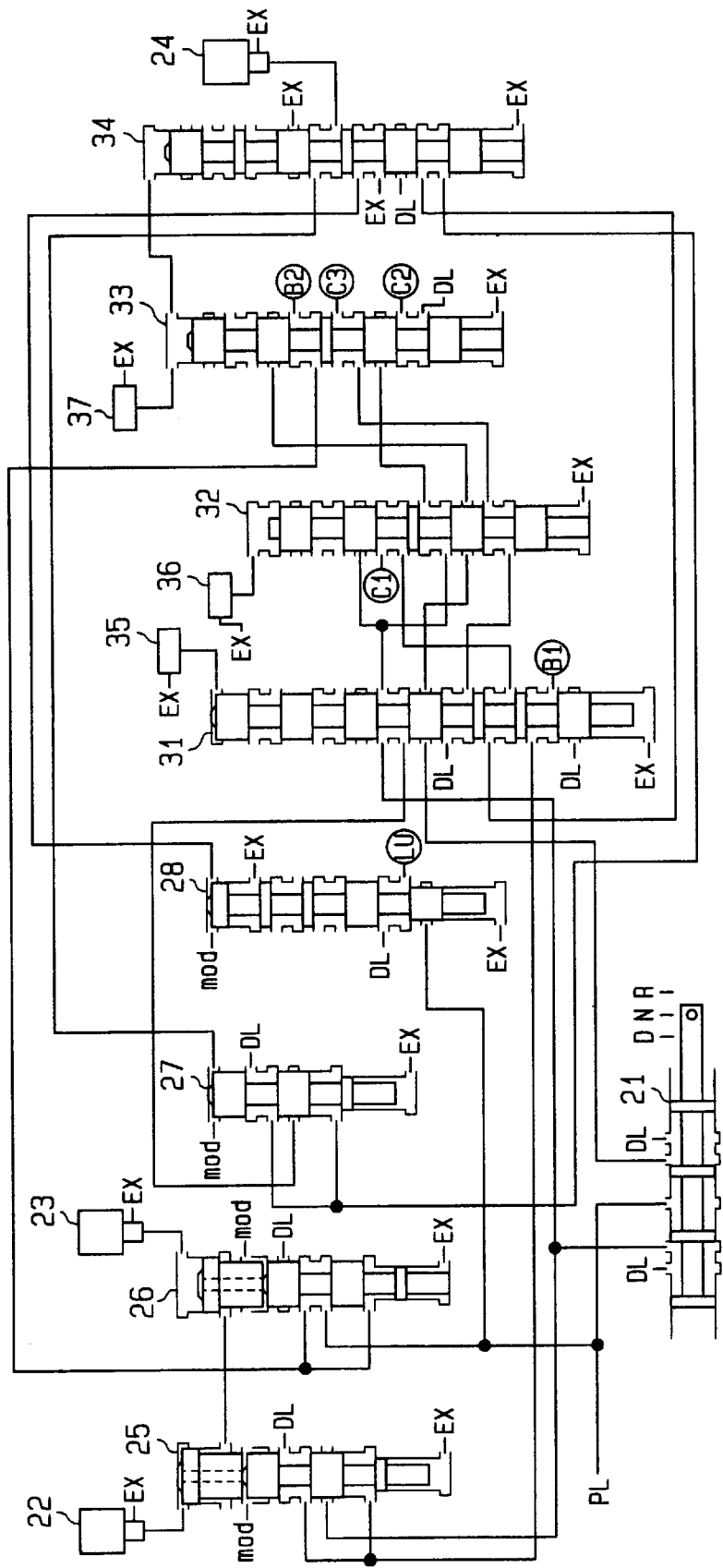
FIG. 6 is a hydraulic circuit diagram of a oil pressure control unit according to a different shift pattern.

FIG. 6 shows the hydraulic circuit of the oil pressure control unit 3 under the neutral range upon the shift pattern 1. In this case, the ON-OFF solenoid valve 35 is electrically de-excited to maintain the first shift valve 31 under the second operating condition. The ON-OFF solenoid valve 36 is electrically excited to maintain the second shift valve 32 under the first operating condition. The ON-OFF solenoid valve 37 is electrically excited to maintain the shift valves 33, 34 under the first operating condition. The line pressure PL is supplied only to the second control valve 26 and the second control valve 26 applies the line pressure PL for supplying the control pressure to the second friction brake B2 via the third shift valve 33. As illustrated in FIG. 14, the control pressure supplied to the second friction brake B2 from the second control valve 26 is set to be at a high pressure level under the neutral range so as to engage the second friction brake B2.

Figure 5:
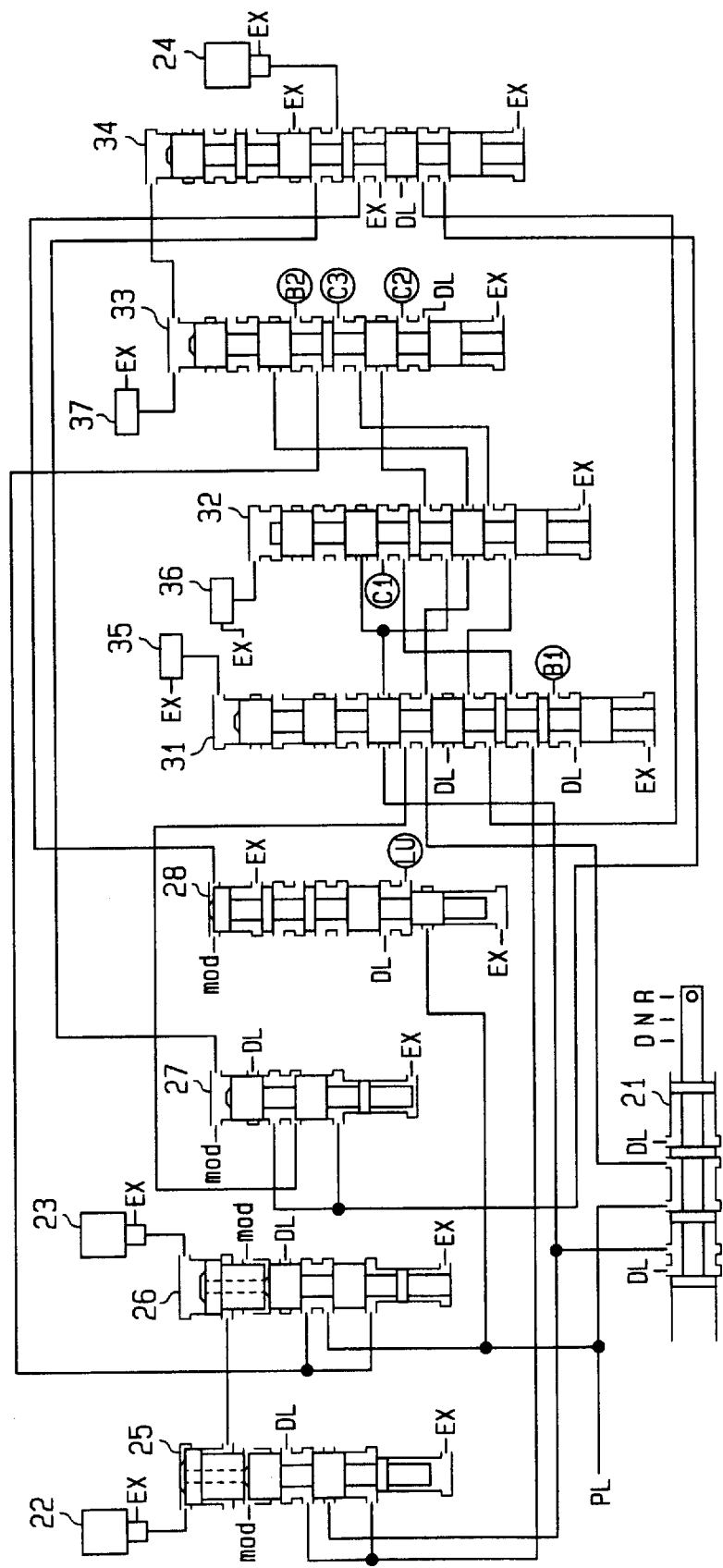
FIG. 5 is a hydraulic circuit diagram of the oil pressure control unit according to a different shift pattern.

FIG. 5 shows the hydraulic circuit of the oil pressure control unit 3 under the reverse range upon the shift pattern 0. In this case, the ON-OFF solenoid valve 35 comes under the electrically excited condition, as do the ON-OFF solenoid valves 36, 37, to maintain the first, second, third and fourth shift valves 31, 32, 33, 34 under the first operating condition. The line pressure PL is supplied to the start control valve 27 via the manual valve 21 and the first shift valve 31 in addition to the second control valve 26 already being supplied with the line pressure PL. The start control valve 27 applies the line pressure for supplying the control pressure to the third friction clutch C3 via the fourth shift valve 34, the first, second third shift valves 31, 32, 33. As illustrated in FIG. 15, the control pressure supplied to the third friction clutch C3 is increased from a low pressure level to a high pressure level to engage the third friction clutch C3 while the control pressure to the second friction brake B2 is maintained at the high pressure level. Therefore, the shift stage upon the shift pattern 0 is shifted from the neutral shift stage to the reverse shift stage. Upon this shifting operation, only the third friction clutch C3 is required to be engaged while the second friction brake B2 has been already engaged in the neutral range. Therefore, the response of the friction engagement elements upon the shifting operation from the neutral shift stage to the reverse shift stage is improved.

Figure 4:
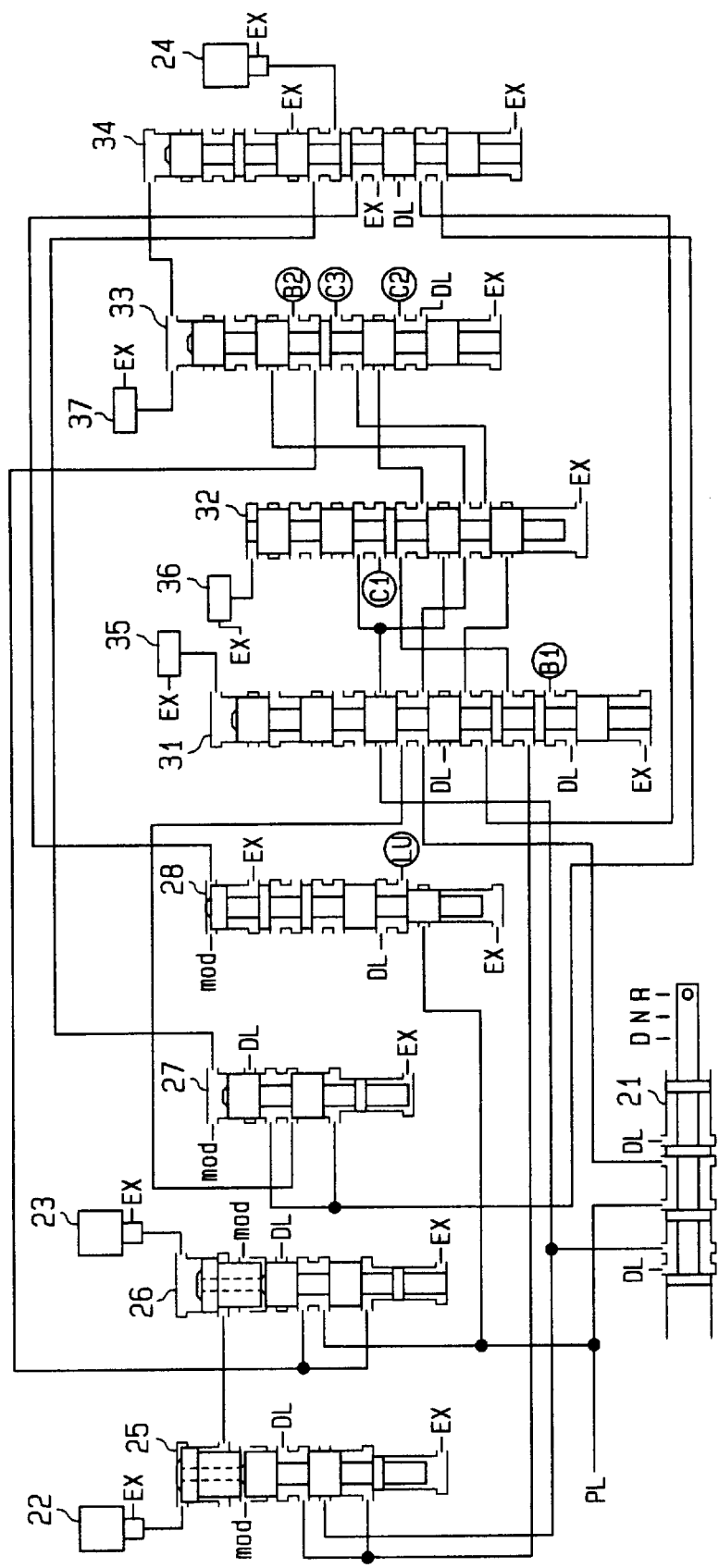
FIG. 4 is a hydraulic circuit diagram of the oil pressure control unit of the automatic transmission and an operating condition thereof at a higher speed according to an embodiment of the present invention.

FIG. 4 shows the hydraulic circuit of the oil pressure control unit 3 under the reverse range upon a shift pattern −1. In this case, the ON-OFF solenoid valve 36 is electrically de-excited to maintain the second shift valve 32 under the second operating condition. The communication between the start control valve 27 and the third friction clutch C3 is interrupted via the second shift valve 32. The line pressure PL is supplied to the third friction clutch C3 via the first, second, third shift valves 31, 32, 33. The third friction clutch C3 is hence engaged by the line pressure PL with higher oil pressure than the control pressure supplied from the start control valve 27.

Figure 7:
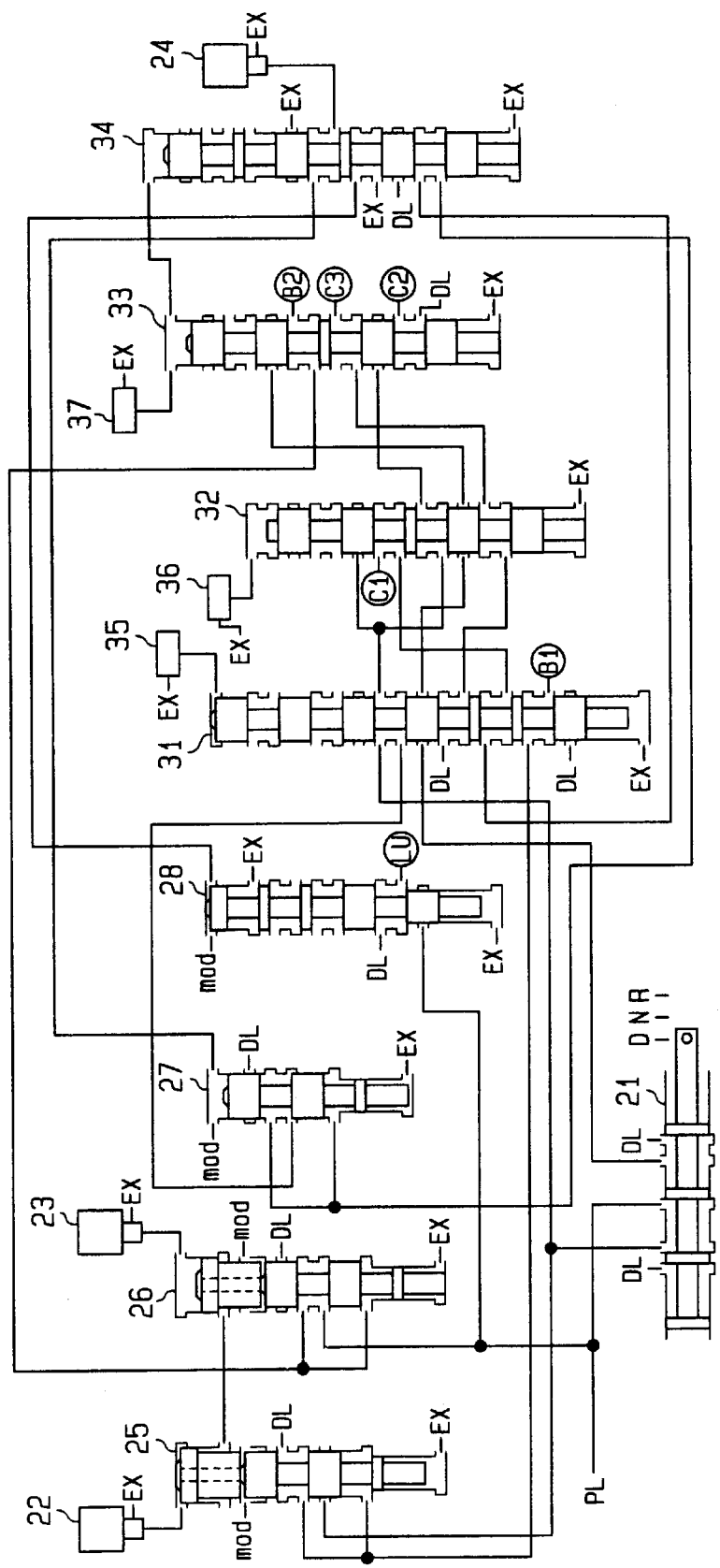
FIG. 7 is a hydraulic circuit diagram of a oil pressure control unit according to a different shift pattern.

FIG. 7 shows the hydraulic circuit of the oil pressure control unit 3 under the driving range upon the shift pattern 1. In this case, the line pressure PL is introduced to the first control valve 25 via the manual valve 21 in addition to the second control valve 26. The control pressure from the first control valve 25 can be supplied to the first friction brake B1 via the first shift valve 31 by electrically exciting the linear solenoid valve 22 and cannot be supplied to the first friction brake B1 by electrically de-exciting the linear solenoid valve 22.

The start control valve 27 is supplied with the line pressure PL via the manual valve 21 and the first shift valve 31. The control pressure from the start control valve 27 can be supplied to the first friction clutch C1 via the fourth shift valve 34, and the first and second shift valves 31, 32 by electrically exciting the linear solenoid valve 24 and cannot be supplied to the first friction clutch C1 by electrically de-exciting the linear solenoid valve 24. As illustrated in FIG. 16, the first friction clutch C1 is engaged by increasing the control pressure supplied from the start control valve 27 from a low pressure level to a high pressure level while the control pressure supplied from the second control valve 26 to the second friction brake B2 is maintained at a high pressure level. Therefore, the shift stage upon the shift pattern 1 is shifted from the neutral shift stage to the first shift stage. Only the first friction clutch C1 is required to be engaged because the second friction brake B2 has been already engaged at the neutral range in the shift pattern 1. Therefore, the response of the friction engagement elements is improved when the shift stage is shifted from the neutral shift stage to the first shift stage.

Further, the first friction brake B1 is engaged in response to the increase of the control pressure supplied thereto from the first control valve 25 from a low pressure level to a high pressure level and the second friction brake B2 is disengaged in response to a decrease of the control pressure supplied thereto from the second control valve 26. Therefore, the shift stage upon the shift pattern 1 is shifted from the first shift stage to the second shift stage.

Further, according to the illustrated and described embodiment, when the control pressure from the first control valve 25 to the first friction brake B1 is increased from a low pressure level to a high pressure level, the first friction brake B1 is engaged at the neutral shift stage in the driving range. Therefore, the output of the output shaft 12 is interrupted in response to the engaged condition of the first and second friction brakes B1, B2 to perform the hill hold function.

Figure 8:
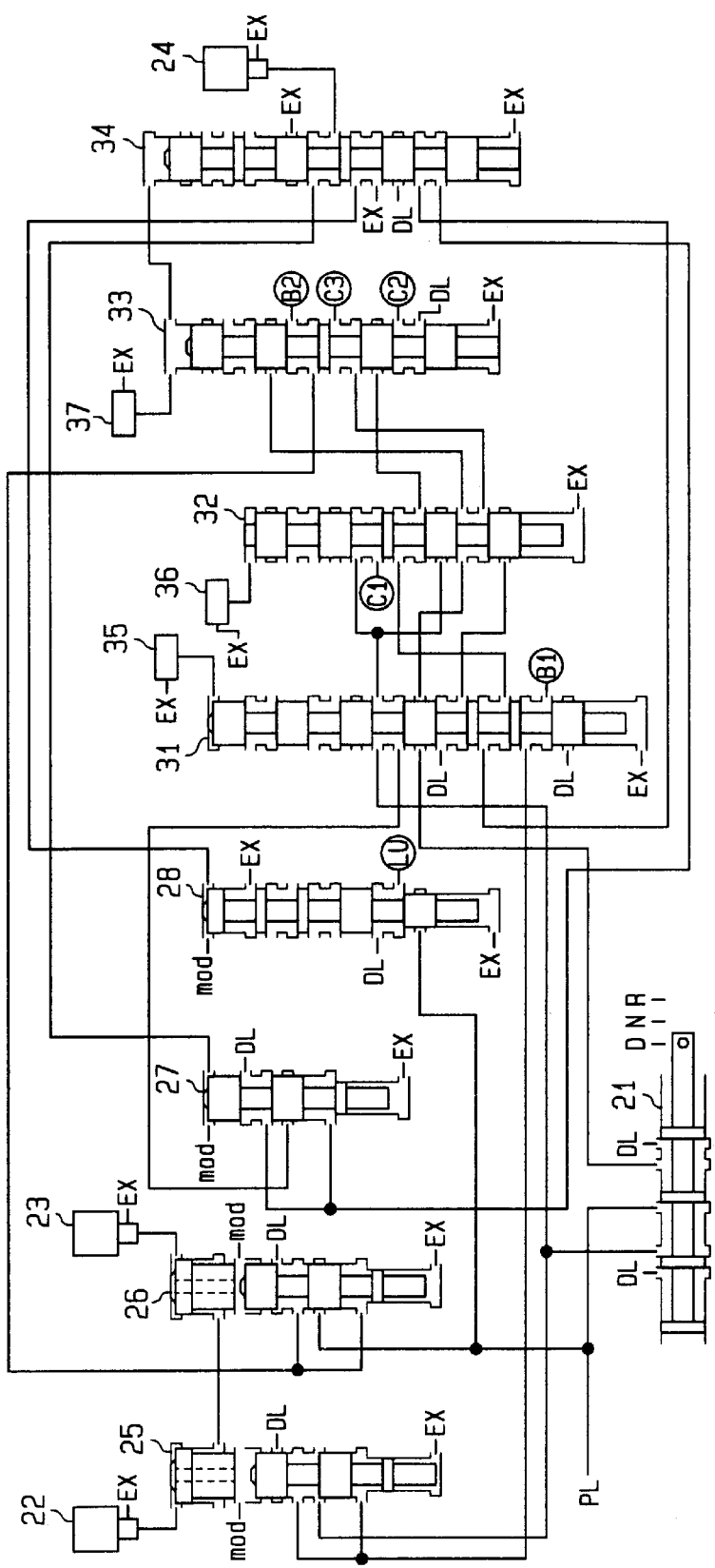
FIG. 8 is a hydraulic circuit diagram of a oil pressure control unit according to a different shift pattern.

FIG. 8 shows the hydraulic circuit of the oil pressure control unit 3 in the driving range at shift pattern 2. The ON-OFF solenoid valve 36 is electrically de-excited so as to return the second shift valve 32 to the second operating condition. In this case, the communication between the start control valve 27 and the first friction clutch C1 is interrupted by the second shift valve 32. The line pressure PL is supplied to the first friction clutch C1 via the manual valve 21, and the first and second shift valves 31, 32. The first friction clutch C1 is strongly engaged by the line pressure PL at a higher oil pressure than the control pressure from the start control valve 27. As illustrated in FIG. 17, the first shift stage at the shift pattern 2 is performed only when the control pressure supplied to the second friction brake B2 from the second control valve 26 is increased to a high pressure level. On the other hand, the second shift stage upon the shift pattern 2 is performed only when the control pressure supplied to the first friction brake B1 from the first control valve 25 is increased to a high pressure level.

Figure 9:
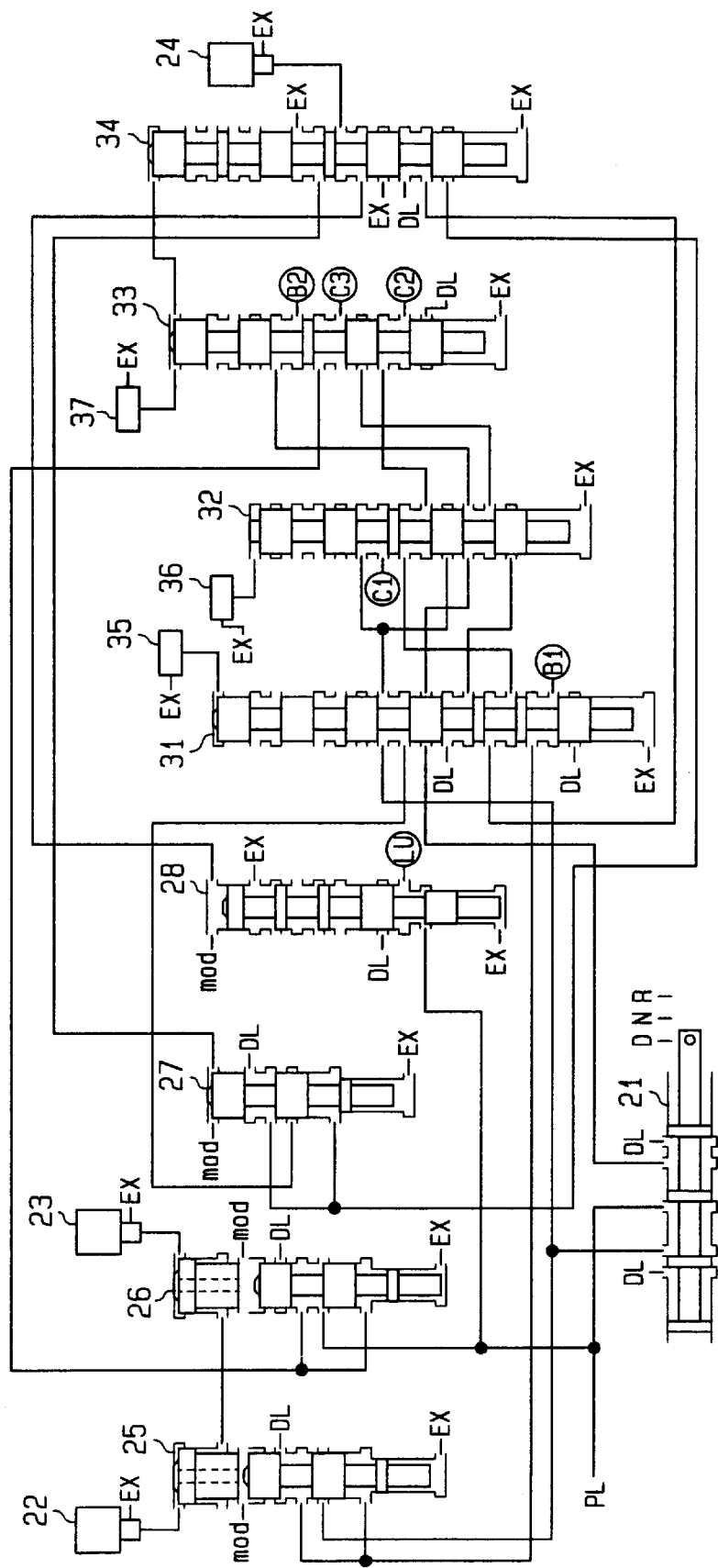
FIG. 9 is a hydraulic circuit diagram of a oil pressure control unit according to a different shift pattern.

FIG. 9 shows the hydraulic circuit of the oil pressure control unit 3 in the driving range at the shift pattern 3. In this case, the ON-OFF solenoid valve 37 is electrically de-excited to maintain all of the shift valves 31, 32, 33, 34 under the second operating condition. The second control valve 26 is connected to the third friction clutch C3 in substitution from the second friction brake B2 via the third shift valve 33. Therefore, the control pressure from the second control valve 26 can be supplied to the third friction clutch C3 via the third shift valve 33 by electrically exciting the linear solenoid valve 24 and cannot be supplied to the third friction clutch C3 by electrically de-exciting the linear solenoid valve 24. As illustrated in FIG. 18, the second shift stage upon the shift pattern 3 is performed only when the control pressure supplied to the first friction brake B1 from the first control valve 25 is increased to a high pressure level. On the other hand, the third shift stage upon the shift pattern 3 is performed only when the control pressure supplied to the third friction clutch C3 from the second control valve 26 is increased to a high pressure level.

Figure 10:
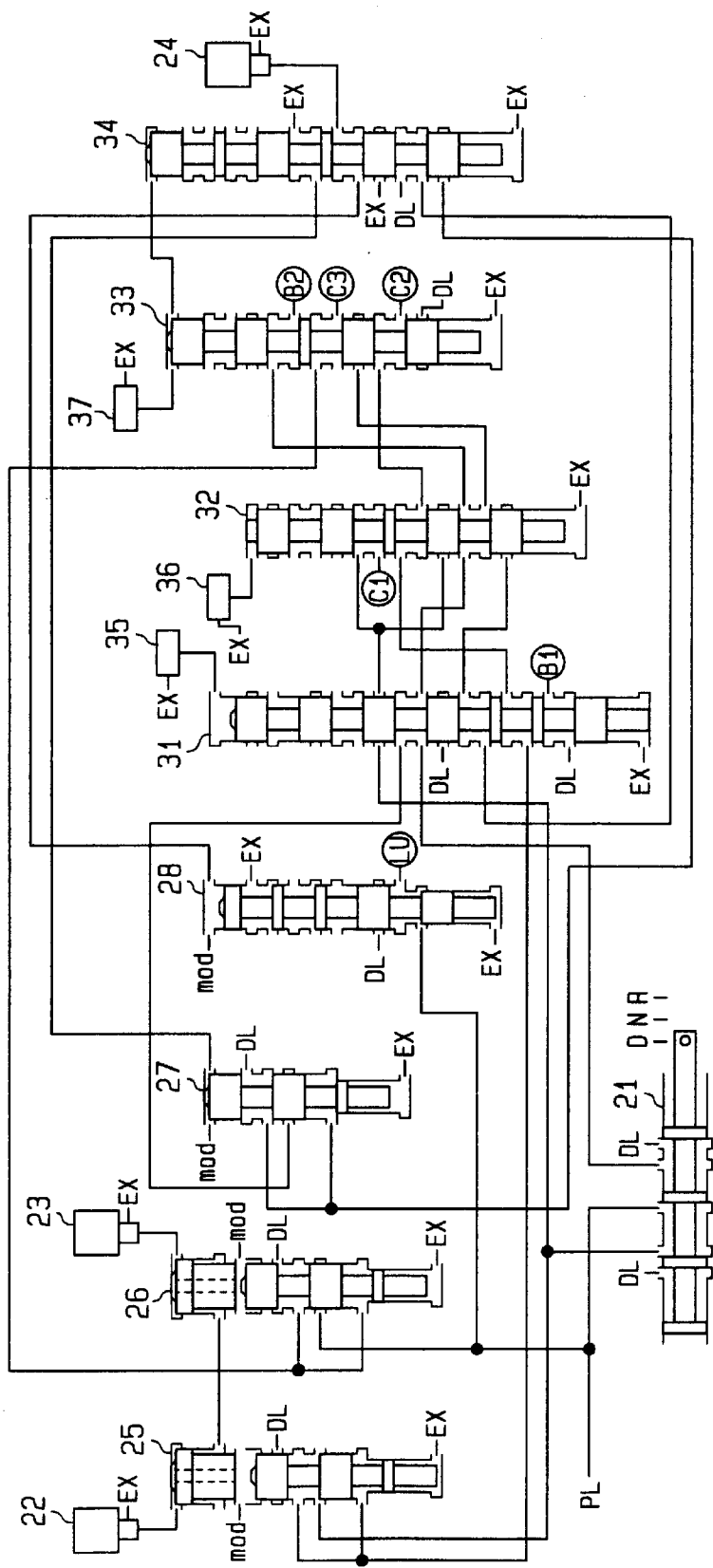
FIG. 10 is a hydraulic circuit diagram of a oil pressure control unit according to a different shift pattern.

FIG. 10 shows the hydraulic circuit of the oil pressure control unit 3 in the driving range at the shift pattern 4. The ON-OFF solenoid valve 35 is electrically excited to bias the shift valve 31 to the first operating condition. The communication between the first control valve 25 and the first friction brake B1 is interrupted by the first shift valve 31. The first control valve 25 is connected to the second friction clutch C2 via the first, second and third shift valves 31, 32, 33. Therefore, the control pressure from the first control valve 25 can be supplied to the second friction clutch C2 via the first, second and third shift valves 31, 32, 33 by electrically exciting the linear solenoid valve 22 and cannot be supplied to the second friction clutch C2 by electrically de-exciting the linear solenoid valve 22. As illustrated in FIG. 19, the third shift stage upon the shift pattern 4 is performed only when the control pressure supplied to the third friction clutch C3 from the second control valve 26 is increased to a high pressure level. On the other hand, the fourth shift stage upon the shift pattern 4 is performed only when the control pressure supplied to the second friction clutch C2 from the first control valve 25 is increased to a high pressure level.

Figure 11:
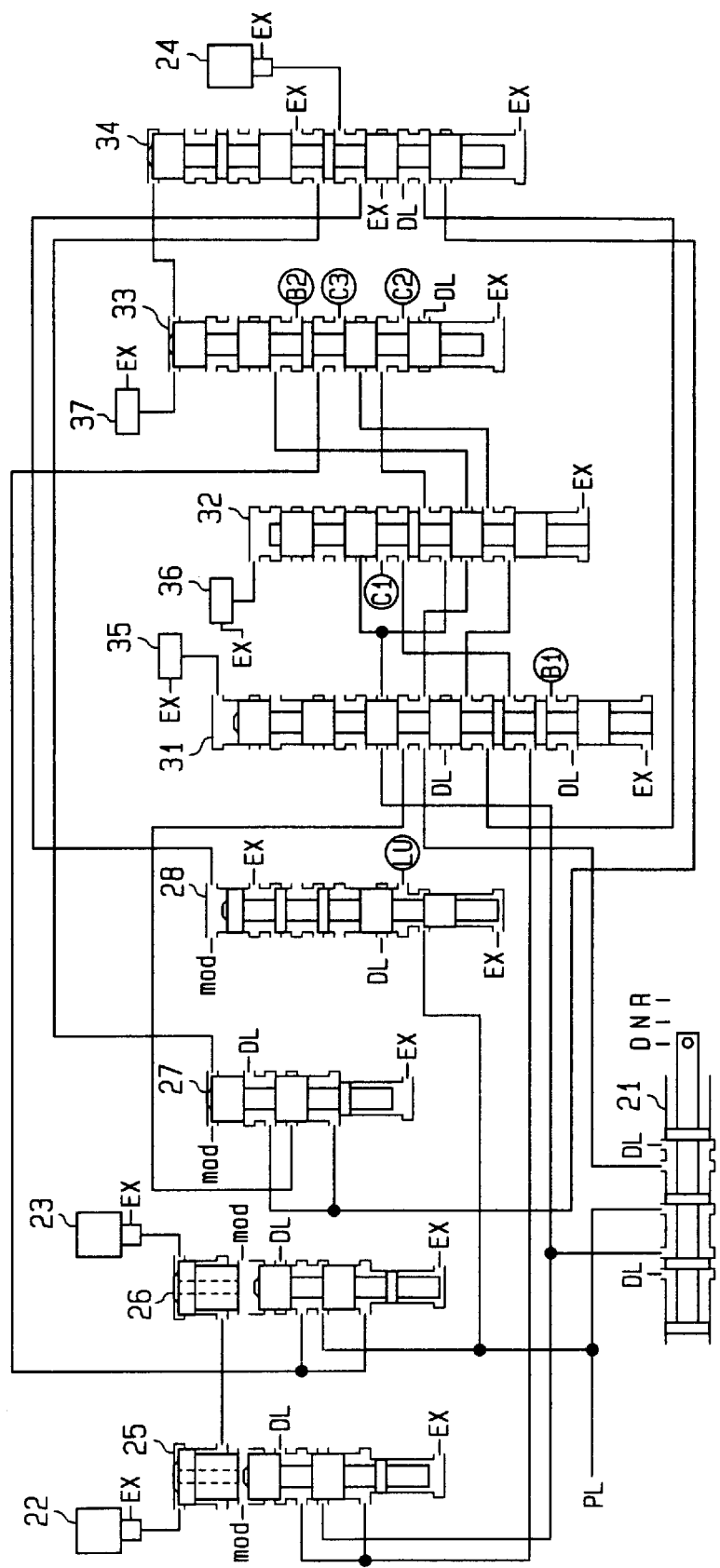
FIG. 11 is a hydraulic circuit diagram of a oil pressure control unit according to a different shift pattern.

FIG. 11 shows the hydraulic circuit of the oil pressure control unit 3 in the driving range upon the shift pattern 5. The ON-OFF solenoid valve 36 is electrically excited to bias the shift valve 32 to the first operating condition. In this case, the first control valve 25 is connected to the first friction clutch C1 in substitution for the second friction clutch C2 via the first and second shift valves 31, 32. The control pressure from the first control valve 25 can be supplied to the first friction clutch C1 via the first and second shift valves 31, 32 by electrically exciting the linear solenoid valve 22 and cannot be supplied to the first friction clutch C1 by electrically de-exciting the linear solenoid valve 22. The line pressure PL is supplied to the second friction clutch C2 via the manual valve 21, and the first, second and third shift valves 31, 32, 33. As illustrated in FIG. 20, the fourth shift stage upon the shift pattern 5 is performed only when the control pressure supplied to the first friction clutch C1 from the first control valve 25 is increased to a high pressure level. On the other hand, the fifth shift stage at the shift patter 5 is performed only when the control pressure supplied to the third friction clutch C3 from the second control valve 26 is increased to a high pressure level.

Figure 12:
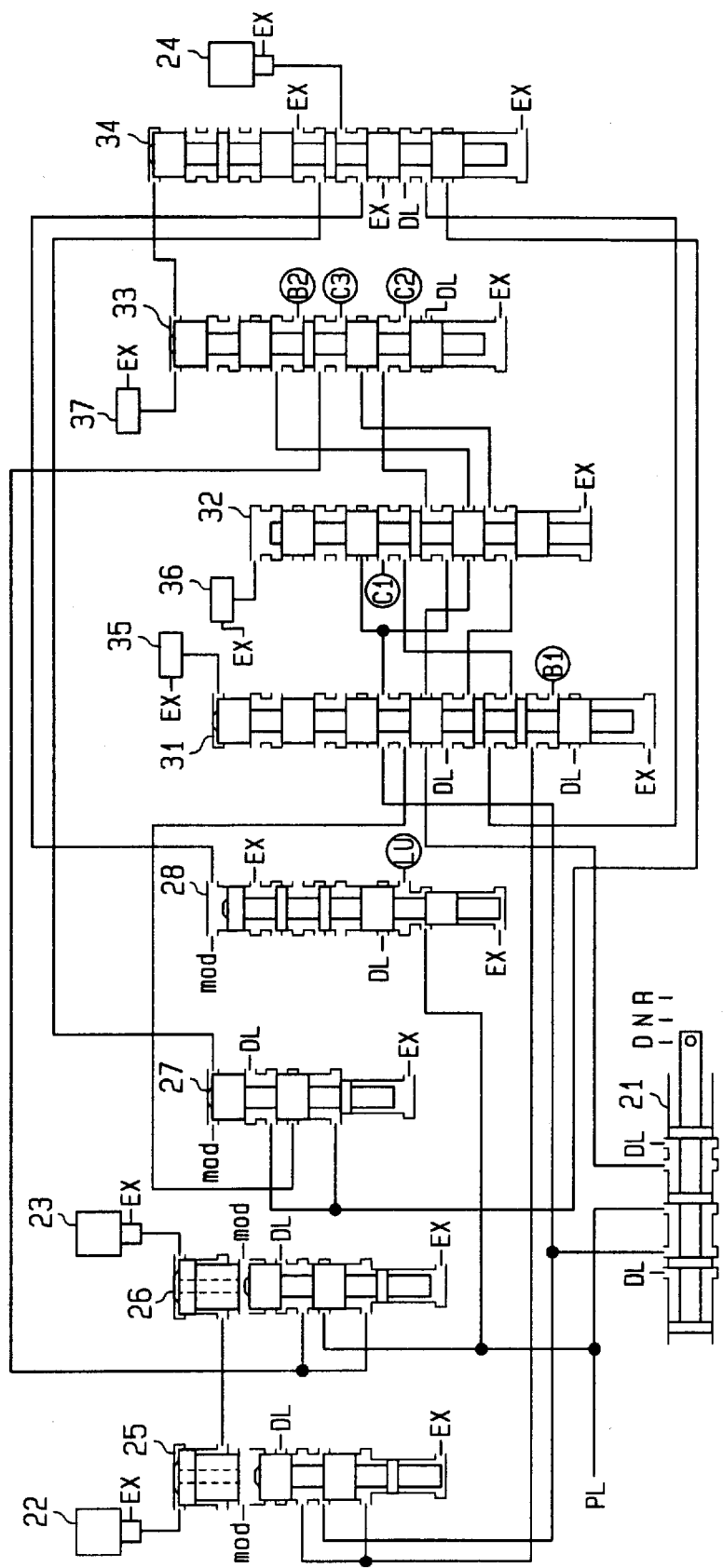
FIG. 12 is a hydraulic circuit diagram of a oil pressure control unit according to a different shift pattern.

FIG. 12 shows the hydraulic circuit of the oil pressure control unit 3 in the driving range at the shift pattern 6. The ON-OFF solenoid valve 35 is electrically excited to return the shift valve 31 to the second operating condition. In this case, the first control valve 25 is connected to the first friction brake B1 in substitution for the first friction clutch C1 via the first shift valve 31. The control pressure from the fist control valve 25 can be supplied to the first friction brake B1 via the first shift valve 31 by electrically exciting the linear solenoid valve 22 and cannot be supplied to the first friction brake B1 by electrically de-exciting the linear solenoid valve 22. As illustrated in FIG. 21, the fifth shift stage upon the shift pattern 6 is performed only when the control pressure supplied to the third friction clutch C3 from the second control valve 26 is increased to a high pressure level. On the other hand, the sixth shift stage upon the shift patter 6 is performed only when the control pressure supplied to the first friction brake B1 from the first control valve 25 is increased to a high pressure level.

Referring to FIG. 1, the electronic control unit 4 is provided with a microcomputer and is connected to an engine rotational speed sensor 41, an input shaft rotational speed sensor 42, an output shaft rotational speed sensor 43, a throttle opening degree sensor 44, and a position sensor 45. The engine rotational speed sensor 41 detects the rotational number of the output shaft of the engine 2, the input shaft rotational speed sensor 42 detects the rotational number of the input shaft 11 of the automatic transmission 1, the output shaft rotational speed sensor 43 detects the rotational number of the output shaft 12 of the automatic transmission 1. The rotational number of the output shaft 12 corresponds to the vehicle speed. The throttle opening degree sensor 44 detects the throttle opening degree θ of the engine 2. The throttle opening degree θ of the engine 2 corresponds to the engine load. The position sensor 45 detects the position of the shift lever that is manually operated by a driver. The electronic control unit 4 controls the electric current being applied to the first, second and third linear solenoid valves 22, 23, 24, and the ON-OFF solenoid valves 35, 36, 37. Therefore, a predetermined shift pattern is selected and the automatic transmission 1 performs the required shift stage which can be selected upon the selected shift pattern.

According to the described and illustrated embodiment of the automatic transmission hydraulic control apparatus, the first shift stage can be performed sequentially upon the shift pattern 1 and the shift pattern 2. Upon the shift pattern 1, the control pressure is supplied to the friction clutch C1 from the start control valve 27. Upon the shift pattern 2, the line pressure PL is supplied to the first friction clutch C1. Further, the reverse shift stage can be performed sequentially upon the shift pattern 0 and the shift pattern −1. Upon the shift pattern 0, the control pressure is supplied to the third friction clutch C3 from the start control valve 27. At the shift pattern −1, the line pressure PL is supplied to the third friction clutch C3.

Therefore, when the shifting operation is performed from the neutral shift stage to the first shift stage, the shift pattern 1 is primarily set for accurately adjusting the oil pressure by supplying the control pressure from the start control valve 27 to the first friction clutch C1. The shift pattern is then switched from the shift pattern 1 to the shift pattern 2 for supplying the line pressure PL to the first friction clutch C1 to ensure that sufficient oil pressure is supplied to the first friction clutch C1. On the other hand, when the shifting operation is performed from the neutral shift stage to the reverse shift stage, the shift pattern 0 is primarily set for accurately adjusting the oil pressure by supplying the control pressure from the start control valve 27 to the third friction clutch C3. The shift pattern is then switched from the shift pattern 0 to the shift pattern 1 for supplying the line pressure PL to the third friction clutch C3 to ensure that sufficient oil pressure is supplied to the third friction clutch C3.

In addition, the control pressure supplied to the second friction brake B2 is set at a high pressure level for engaging the second friction brake B2 at the neutral range of the driving range. The second friction brake B2 is required to be engaged for performing both the first shift stage and the reverse shift stage.

When the neutral range is switched to either the driving range or the reverse range for shifting the shift stage to either the first shift stage or the reverse shift stage, the oil pressure is required to be supplied only to either the first friction clutch C1 for the first shift stage or the second friction brake B2 for the second shift stage. As described above, the response is improved by reducing the number of friction engagement elements to be engaged at the same time, i.e., by reducing the number of friction engagement elements to be supplied with oil pressure at the same time.

Also, the control pressure is supplied to the first and second friction brakes B1, B2 upon the neutral shift stage upon the driving range. Therefore, the first and second friction brakes B1, B2, can be engaged respectively so as not to rotate the rotational shaft 12. Generally, the first and second friction graces B1, B2 are under the disengaged condition upon the neutral shift stage of the driving range so as not to transmit the rotation of the engine 2 to the automatic transmission 1. Therefore, when the vehicle is started, the automatic transmission 1 is required to be connected to the engine 2 again. For example, the vehicle parked on an up-hill is moved in the vehicle rearward direction until the connection therebetween is completed.

On the other hand, at the neutral shift stage of the driving range, the output of the output shaft 12 is designed to be interrupted as described above. Therefore, the shift stage can be shifted to the first shift stage without moving the vehicle in the vehicle rearward direction. That is, a smooth start of the vehicle on a hill can be performed.

The supply of oil pressure is required to be supplied to either the first friction clutch C1 or the second friction clutch C2 for moving the vehicle in the vehicle forward direction. The supply of oil pressure thereto can be performed only upon the driving range of the shift range. Further, the supply of oil pressure to both the third friction clutch C3 and the second friction brake B2 for the vehicle rearward movement can be performed only upon the reverse range of the shift range.

Therefore, an undesirable oil pressure supply to the third friction clutch C3 and the second friction clutch B2 can be prevented upon the driving range. On the other hand, an undesirable oil pressure supply to either the first friction clutch C1 or the second friction clutch C2 can be prevented upon the reverse range. Therefore, unintended driving upon each shift range due to mechanical failure including various valves, for example the reverse movement upon the driving range, the forward movement upon the reverse range, and the reverse and forward movements upon the neutral range, can be prevented.

As an alternative to the described and illustrated embodiment, a one-way clutch can be provided for mechanically engaging the second friction brake B2. In this case, when the shift stage is shifted from the neutral shift stage to the first shift stage, the neutral shift stage can be smoothly shifted to the first shift stage by adjusting the control pressure supplied to the first friction clutch C1 from the start control valve 27.

Also, in the described and illustrated embodiment, the ON-OFF solenoid valves 35, 36, 37 are normally closed type valves. However, those valves 35, 36, 37 can be normally open type valves. Additionally, the automatic transmission 1 described above performs six forward shift stages. However, the automatic transmission 1 can be structured to perform a different number of shift stages.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What I claim is:

1. An oil pressure control apparatus for an automatic transmission comprising:

plural linear solenoid valves for outputting modulated pressure in response to electric current applied to the linear solenoid valves;

plural control valves for outputting control pressure in response to the modulated pressure from the linear solenoid valves;

plural friction engagement elements to be engaged or disengaged in response to supply of either the control pressure from the control valves or line pressure for performing plural shift stages through engagement or disengagement of combinations of the plural friction engagement elements;

plural shift valves for changing the friction engagement element supplied with the control pressure or the line pressure in response to oil pressure applied to the shift valves;

plural ON-OFF solenoid valves for changing the supply condition of the oil pressure to the shift valves in response to electric current applied to the ON-OFF solenoid valves;

a control unit for controlling the control pressure from the control valves by controlling the electric current applied to the linear solenoid valves and for changing the friction engagement element to be supplied with the control pressure or the line pressure via the shift valve by controlling the electric current applied to the ON-OFF solenoid valves; and the control unit setting a first shift pattern to supply the control pressure to the friction engagement element for a first shift stage or a reverse shift stage from the control valve by a first combination of a current applied condition of the plural ON-OFF solenoid valves upon performing the first shift stage or the reverse shift stage and a second shift pattern to supply the line pressure to the friction engagement element for the first shift stage or the reverse shift stage by a second combination of the current applied condition of the plural ON-OFF solenoid valves upon performing the first shift stage or the reverse shift stage.

2. The oil pressure control apparatus for an automatic transmission, according to claim 1, wherein the control unit determines the control pressure to be supplied to a common friction engagement element to be engaged at the first shift stage and at the reverse shift stage upon a neutral range so as to shift to the first shift stage and the reverse shift stage.

3. The oil pressure control apparatus for an automatic transmission, according to claim 1, wherein the control unit determines the control pressure to be supplied to a required friction engagement element upon a neutral shift stage of a driving range for engaging the required friction engagement element so as not to rotate an output shaft of the automatic transmission.

4. The oil pressure control apparatus for an automatic transmission, according to claim 1, further comprising:

a manual valve operated in response to a changing of a shift range for changing the supply of the oil pressure to the friction engagement elements, the supply of the oil pressure to any one of the friction engagement elements to be engaged for a vehicle forward movement being performed via the manual valve only upon the driving range and the supply of the oil pressure to a required friction engagement element to be engaged for a vehicle rearward movement being performed via the manual valve only upon the reverse range.

5. An oil pressure control apparatus for an automatic transmission that includes an output shaft comprising:

plural linear solenoid valves which output modulated pressure in response to electric current applied to the linear solenoid valves;

plural control valves which output control pressure in response to the modulated pressure from the linear solenoid valves;

a first friction clutch, a second friction clutch, a third friction clutch, a first friction brake and a second friction brake constituting plural friction engagement elements to be engaged or disengaged in response to supply of either the control pressure from the control valves or line pressure for performing plural shift stages through engagement or disengagement of combinations of the plural friction engagement elements;

plural shift valves which change the friction engagement element supplied with the control pressure or the line pressure in response to oil pressure applied to the shift valves;

plural ON-OFF solenoid valves which change the supply condition of the oil pressure to the shift valves in response to electric current applied to the ON-OFF solenoid valves;

a manual valve operated in response to a change of a shift range for changing the supply of the oil pressure to the friction engagement elements;

a control unit for controlling the control pressure from the control valves by controlling the electric current applied to the linear solenoid valves and for changing the friction engagement element to be supplied with the control pressure or the line pressure via the shift valve by controlling the electric current applied to the ON-OFF solenoid valves;

the control unit setting a plurality of shift patterns to supply the control pressure to the first friction clutch from the control valve for a first shift stage upon performing the first shift stage and supplying the line pressure to the first friction clutch for the first shift stage, and the control unit setting a plurality of shift patterns to supply the control pressure to the third friction clutch from the control valve for a reverse shift stage upon performing the reverse shift stage and supplying the line pressure to the third friction clutch for the reverse shift stage;

the control unit determining the control pressure to be supplied to the second friction brake to be engaged at the first shift stage and at the reverse shift stage upon a neutral range so as to shift to the first shift stage and the reverse shift stage;

the control unit determining the control pressure to be supplied to the first and second friction brakes upon a neutral shift stage of a driving range for engaging the first and second friction brakes so as to not rotate the output shaft of the automatic transmission; and the supply of the oil pressure to the first friction clutch or the second friction clutch to be engaged for vehicle forward movement being performed via the manual valve only upon the driving range, and the supply of the oil pressure to the third friction clutch and the second friction brake to be engaged substantially at one time for vehicle rearward movement being performed substantially at one time via the manual valve only upon the reverse range.

6. The oil pressure control apparatus for an automatic transmission according to claim 5, wherein upon the first shift pattern, the control pressure is supplied to the first friction clutch during both the first shift stage and a second shift stage.

* * * * *